United States Patent [19]
Kay et al.

[11] Patent Number: 5,594,584
[45] Date of Patent: Jan. 14, 1997

[54] DOT SIGHTING DEVICE

[76] Inventors: Ira M. Kay, P.O. Box 1750, 7553 Gary Rd., Manassas, Va. 22110; Ubao Jibiki, 2-7-3 Iligashi Mita, Tama-Ku, Kawasaki-shi, Kanagawa Pref., Japan, 214

[21] Appl. No.: 366,101

[22] Filed: Dec. 29, 1994

[51] Int. Cl.$^6$ .............. G02B 23/00; G02B 23/10; F41G 1/32
[52] U.S. Cl. ............ 359/433; 359/424; 359/429; 33/241; 356/251
[58] Field of Search .................. 359/362, 642, 359/399–421, 430; 33/241–252; 356/246–253, 151, 153; 42/100, 101, 103

[56] References Cited

U.S. PATENT DOCUMENTS

| | | | |
|---|---|---|---|
| 3,963,356 | 6/1976 | Wiklund | 33/241 |
| 4,346,995 | 8/1982 | Morris | 356/251 |
| 4,402,605 | 9/1983 | Ekstrand | 356/252 |
| 4,665,622 | 5/1987 | Idam | 33/241 |
| 4,854,688 | 4/1988 | Hayford | 359/433 |
| 4,863,269 | 6/1988 | Ellis | 356/251 |
| 4,973,130 | 11/1990 | Gernet | 359/642 |
| 5,205,044 | 4/1993 | DePaoli | 42/103 |

*Primary Examiner*—Thong Nguyen

[57] ABSTRACT

A dot sighting device comprises a lens-shaped transparent objective element with convex and concave surfaces, the convex surface extending outwardly toward a target and the concave surface extending toward a user's eye. The concave surface has a first center of curvature lying on a baseline parallel to an optical axis of the element extending from a center of the element to the user's eye. The concave surface has a first radius from the first center of curvature to a center of the concave surface. The baseline and the first radius subtends an angle θ with each other. The convex surface has a second center of curvature positioned eccentrically from the first center of curvature located in a plane containing the baseline and the first radius. The convex surface has a second radius extending from the second center of curvature to a center of the convex surface. A light source is disposed behind the element and directed toward the center of the concave surface such that a light flux makes an angle θ with the first radius, the light source being adapted to project a light dot on the concave surface to be reflected to the user's eye.

5 Claims, 5 Drawing Sheets

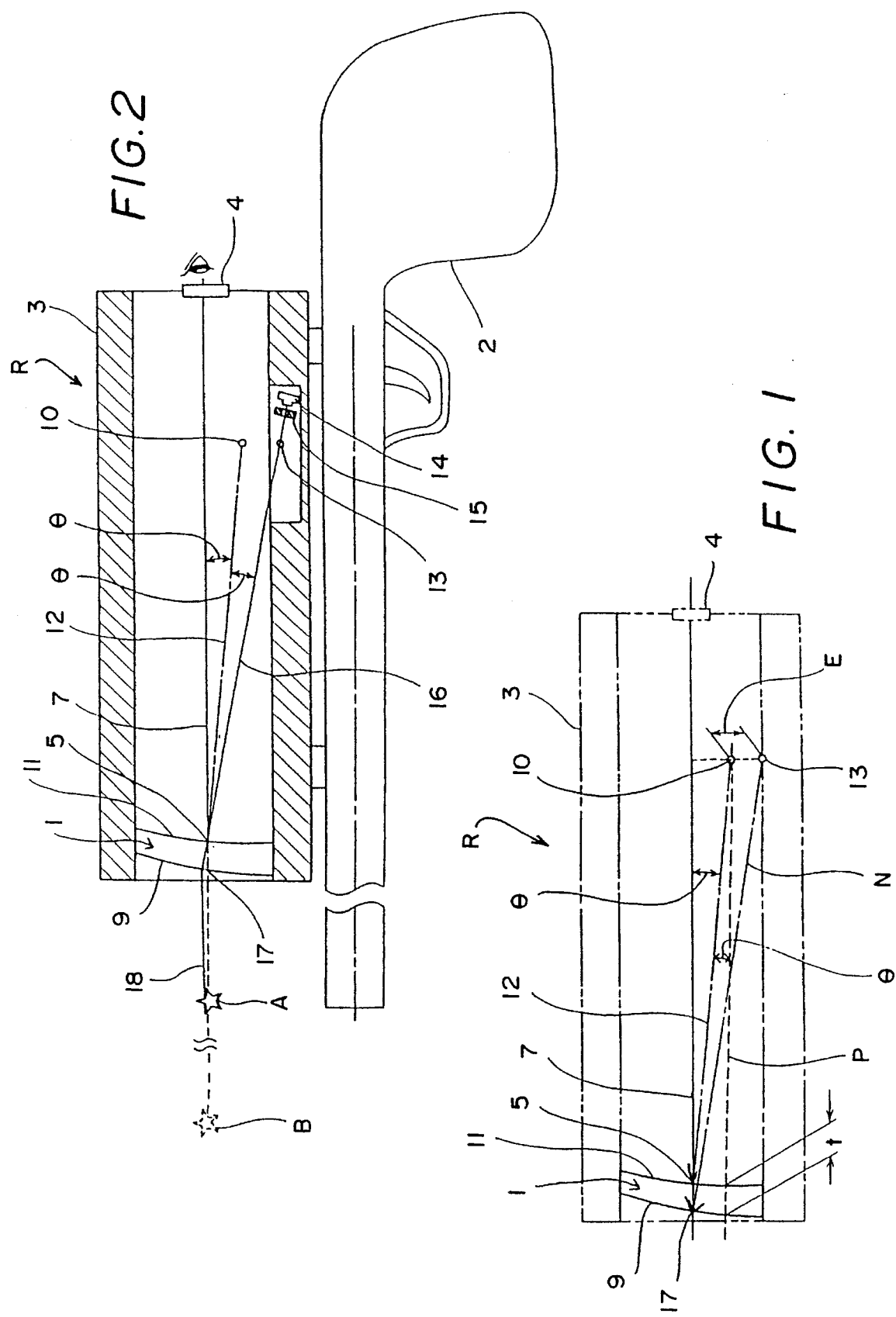

DOT SIGHTING DEVICE

BACKGROUND OF THE INVENTION

The present invention concerns a sighting device of the type which is mounted on the barrel of firearms, and which is conventionally called a dot sight and is used for shooting targets at close range. The present invention provides a dot sighting device which is aligned on the target.

PRIOR ART

The dot sights of the prior art will be described with reference to FIGS. 7, 8, 9 and 10. FIG. 7 is a side view of a dot sight device of the prior art in which a scope case 101 is attached to the barrel of a firearm 102. FIG. 7 shows a sectional view of the dot sight. The size of the dot sight has been enlarged with respect to size of the firearm to aid in explanation.

The scope case 101 is cylindrical and on the side nearest the shooter's eye is a disc shaped transparent eyepiece element 104. On the objective side is a transparent objective element 103 which is tilted slightly toward the transparent eyepiece element 104. The optic axis 107 is shown by the line passing through the center 105 of the concave surface 110 of the transparent objective element 103 and extending toward the transparent eyepiece element 104. This optic axis 107 is parallel to the center line of the bore of the firearm 102.

In the prior art, most of the transparent objective elements 103 were made of glass and were constituted of a spherical shaped convex surface 109 that faced outwardly and a spherical shaped concave surface 110 that faced inwardly, the two surfaces approximating a lens shape but providing no lens effect. In addition, the concave surface 110 was coated with a reflective film reflecting red light.

This convex surface 109 and concave surface 110 share a common center of curvature 111. As described above, the objective transparent element used in dot sights of the prior art had the same center of curvature for both the convex and concave surfaces.

This common center of curvature 111 is eccentric in that it diverts sightly from the optic axis 107 toward the bore center line 108. The normal line, i.e. the radius 112 which runs from this center of curvature 111 to the center of concave surface 110 is the optic axis for the concave surface 110. This radius 112 at center 105 forms an angle θ at the intersection of the optic axis 107 and the transparent objective element 103. This angle θ is set to be from 6 to 7 degrees, and it corresponds to the above mentioned tilt angle of the transparent objective element.

The scope case 101 contains a dot plate 115 with a very small aperture 114, which directs the light from a light emitting diode 113 toward the center 105 of the concave surface 110. The red light from the light emitting diode 113 passes through the small aperture 114, and becomes a fine light flux 116 which irradiates the center 105 of the concave surface 110. Here, the fine light flux 116, the radius 112, and the optic axis are positioned on a single plane. Moreover, the angle θ formed by the intersection of the fine light flux 116 and the radius 112 has been set to be equivalent to the angle between the radius 112 and the optic axis 107.

In view of the foregoing structure, due to the red reflective coating on the concave surface 110, the fine light flux 116 from the light emitting diode 113 is reflected from the center 105, so that it follows the optic axis 107 appearing to the shooter as a red dot.

Now, when one of the shooter's eyes is positioned at the eyepiece 104, the shooter sees a round field of view and a dot of red light at the center 105 of the concave surface 110. The red light sighting position is adjusted on a target A to correspond with the barrel alignment.

However, at this time, the extended shooter's optic axis 107 is aligned on a false image B to which the sighting has been adjusted, as best shown in FIGS. 7 and 8, and which is misperceived with respect to the sight adjustment for target A.

In other words, in the above described situation, the incoming light 117 from target A undergoes refraction on the convex surface 109 of the transparent objective element 103 and proceeds toward the center of the transparent objective element 103, from where it is once again refracted at the center 105 of the concave surface 110, whereupon it proceeds along the optic axis 107. As a result, from the perspective of the shooter, the target A is the false image B in the extension of the optic axis 107.

FIG. 9 shows the case where one of the shooter's eyes looks through the eyepiece 104 while the other eye—not using the sight—looks at the real image C of a rod-shaped object. Within the round field of view, the sight is adjusted to D, the false image of C. Thus, the eyes of the shooter perceive a deviation from the real image C and the false image D.

FIG. 10 is an optical diagram showing the light paths of a dot sight of the prior art, where such factors as the size of the transparent objective element 103 and the intersection angle between the optic axis 107 and the radius 112 have been modified.

Due to the refraction described above, the dot sights of the prior art produced an error when aligning the sights.

This error caused a psychological problem for shooters who saw a discrepancy between the real image and a false image, and it also produced a sighting error which, due to the close ranges to the target involved, was ignored as a matter of practicality.

The above described problems were the result of the transparent objective element. To wit, its convex surface and concave surface shared the same center of curvature, and the optic axis of the concave surface and the optic axis of the dot sight intersected at the above mentioned angle of intersection. However, it was a necessary condition for the dot sight that the optic axis for the dot sight intersect with the radius from the center of the concave surface within the above described range. Thus, this problem is one which must be addressed in the area of the center of curvature of the transparent objective element.

Furthermore, since the reflective film applied to the concave surface of the transparent objective element was left exposed in devices of the prior art, the life of the reflective film was limited.

SUMMARY OF THE INVENTION

It is therefore an object of the invention to provide a dot sighting device that resolves the aforementioned problems of the prior art, and which can be accurately aimed at the real image of the target.

It is another object of the present invention to provide a reflective film on the concave surface in the dot sighting device with a high effective life.

In order to achieve the foregoing objects, the dot sighting device of the present invention employs a transparent objective element having eccentric centers of curvature between the convex surface and the concave surface of the transparent objective element mounted in the dot sight scope case.

In addition, in order to protect the reflective film coated upon the concave surface of the transparent objective element, the present invention additionally mounts a transparent protective element on that surface.

BRIEF DESCRIPTION OF THE DRAWINGS

FIG. 1 is a side view showing the optical configuration of the dot sighting device of the present invention;

FIG. 2 is a side sectional view showing the dot sighting device of the present invention;

DETAILED DESCRIPTION OF THE INVENTION

Figure 3:
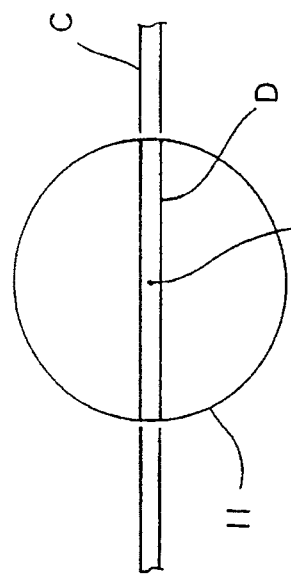
FIG. 3 is a schematic diagram showing how the real image of the target in the field of view is matched to the sight.

The optical configuration of a dot sighting device R of the present invention will be described with reference to FIG. 1. For purposes of explanation, a cylindrical scope case 3 of the dot sighting device R is shown by dashed lines in the diagram.

A transparent objective element 1, preferably made of glass, comprises an outwardly facing spherical convex surface 9 and an inwardly facing spherical concave surface 11, and is lens-like in shape. However, the transparent objective element 1 does not exhibit the lens effect. A multi-layered reflective coating on the concave surface 11 reflects red light.

A baseline P of the transparent objective element 1 passes through the transparent objective element 1 and the point 10, which is the center of curvature of the concave surface 11. A specific angle θ is subtended by the baseline P and the radius 12 extending from the center of concave surface 11 to the center of curvature 10 of the concave surface 11. This angle θ is set in a range between 6 and 7 degrees. While it is preferred that this angle be between 6 and 7 degrees, it is not limited to this range. This radius 12 is also the optic axis of concave surface 11.

The spherical concave surface 11 is mounted in such manner that point 10 is its center of curvature. This concave surface 11 is shaped in such a way that when viewed from the front and from the baseline P, or from the below-described optic axis 7 of the dot sighting device R, it appears to be round.

The center of curvature 13 for the convex surface 9 lies in the plane of the baseline P and the radius 12, and is displaced to the other side of the radius 12. Hence, it is eccentric with respect to the foregoing center of curvature 10. The radius N, which runs from this center of curvature 13 to the center 17 of the convex surface 9 is in the same plane that contains the baseline P and the radius 12.

The convex surface 9 is shaped as a spherical surface with a center of curvature 13. From the baseline P or the above mentioned optic axis 7, this convex surface 9 appears round when viewed from the front.

The optic axis 7 for the dot sighting device is the line that extends from the center 17 of the convex surface 9 through the center 5 of concave surface 11 of the transparent objective element 1 and toward the eyepiece 4. The baseline P is parallel to optic axis 7.

The eccentricity E between the center of curvature 13 of the foregoing convex surface 9 and the center of curvature 10 of the concave surface 11 is the distance on the perpendicular to the baseline P from the optic axis 7 between the centers of curvature 13 and the center of curvature 10.

This eccentricity E satisfies the relationship described below between the thickness t of the transparent objective element 1 along the baseline P and the foregoing angle θ.

In this embodiment, the transparent objective element 1 may also be made of transparent plastic.

The dot sighting device R of the present invention will now be described with reference to FIG. 2. FIG. 2 is a side view of the above mentioned dot sighting device with the scope case 3 mounted on the barrel of a firearm 2. The dot sighting device is shown in cross-section, and its size is exaggerated with respect to the firearm 2.

At the objective end of the scope case 3 is the transparent objective element 1, which is tilted slightly toward the disc-shaped glass eyepiece 4. Since the baseline P runs parallel to the above mentioned optic axis 7, the radius 12 intersects this optic axis 7 at angle θ at the center of the concave surface 11.

A red light emitting diode 14 and a dot plate 15 with a very small aperture are mounted in the scope case 3. A red colored fine light flux 16 from this light emitting diode 14 subtends an angle θ at the center 5 of the concave surface 11 with the radius 12 in the plane including the baseline P and the radius 12.

With the above described structure, a fine light flux 16 from the light emitting diode 14 is reflected from the center 5 of the concave surface 11, along the optic axis 7 to the eyepiece 4.

The light emitting diode is not limited to the type emitting red light; any easily distinguished color may be selected for the light emitting diode. This would also require an appropriate coating on the concave surface of the transparent objective element to reflect that color of light.

FIGS. 2 and 3 will now be used to describe looking through the transparent eyepiece element 4 to align the above described dot sighting device with the target.

Figure 4:
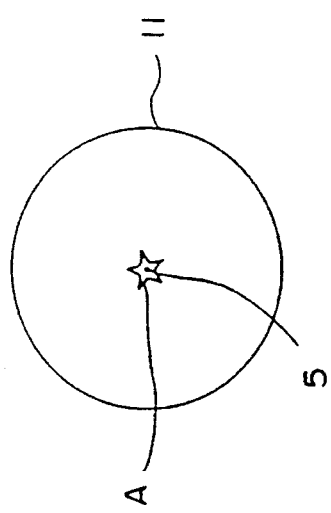
FIG. 4 is a schematic diagram showing how the real image of the target in the field of view is matched to the sight.

At this time, the target A lies in the extension of the optic axis 7. Light from the target A is gathered into a small light flux entering the transparent objective element 1. Here, the explanation will be based on the incoming light ray 18 which is slightly off the center of the target A. This incoming light ray 18 is refracted by the convex surface 9, proceeds through the transparent objective element 1, and is again refracted at the center of the concave surface 11, from where it proceeds straight along the optic axis 7. As a result, as shown in FIG. 3, the actual image of the target A is visible in the background behind the red dot sighting point at the center 5 of the concave surface 11 in the round field of view. At this time, the target A overlaps the false image B and becomes the actual image. FIG. 4 shows how a horizontal rod C would appear with one eye looking through the eyepiece, and the other looking, unaided, at the rod. The rod C appears at the same height position as the image D in the round field of view.

In the dot sighting device of the present invention, there would be some distortion of the target image in the strictest sense, since the center of curvature of the convex surface and the center of curvature of the concave surface of the transparent objective element are eccentric to each other. However, this distortion is so slight that it is not noticeable by the unaided eye.

The above described configuration of the dot sighting device of the present invention resolves the problem of the prior art error in alignment due to refraction.

Figure 5:
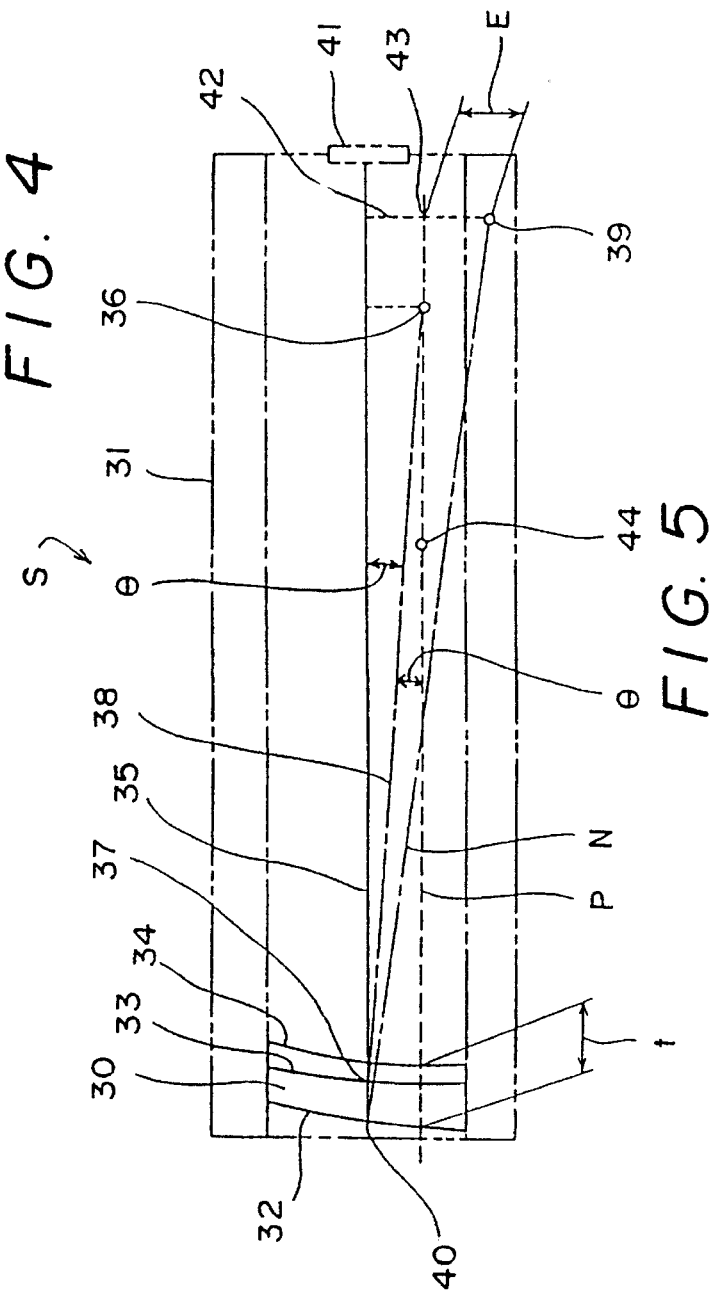
FIG. 5 is a side view showing the optical configuration for another embodiment of the dot sighting device of the present invention.

Another embodiment of dot sighting device S of the present invention will be explained with reference to FIG. 5. For purposes of explanation, the cylindrical scope case 31 for the dot sighting device has been shown by dashed lines.

The transparent objective element 30 is preferably made of glass and comprises a spherical convex surface 32 facing outwardly, and a spherical concave surface 33 facing inwardly. The concave surface 33 is fitted with a multilayered film coating that reflects red light, and a transparent glass protective element 34 has been closely attached.

The point 36 on the base line P is the center of curvature for the concave surface 33. From this center of curvature 36, the baseline P subtends an angle θ of 6 to 7 degrees with the radius 38 from the center 37 of the concave surface 33.

The center of curvature 39 of the convex surface 32 is shifted slightly with respect to the center of curvature 36 of the foregoing concave surface 33 toward the transparent eyepiece element 41 along the baseline P, and further, from the baseline P, toward the other side of the radius 38. The radius N, from the center of curvature 39 to the center 40 of the convex surface 32 is in the plane that includes the baseline P and the radius 38.

The optic axis 35 of the dot sighting device S extends from the center 40 of the convex surface 32 to the center 37 of concave surface 33 and then through the center of the transparent protective element 34 to the eyepiece 41. The baseline P is parallel to the optic axis 35, and point 44 on the baseline P is the center of curvature of the concave surface of the transparent protective element 34.

The eccentricity E of the above mentioned center of curvature 39 of the convex surface 32 is equal to the distance from the intersection point 43 of the perpendicular 42 dropped toward the optic axis 35 with the baseline P to the center of curvature 39.

In the dot sighting device S of the present invention, the eccentricity E described above has been set at an appropriate value for the transparent objective element to allow alignment with the real image of the target. The present inventors have discovered that the relationships among the eccentricity E, the angle θ between the baseline P and the radius 38, and the thickness t along the baseline P of the transparent objective element 30 and the transparent protective element 34 need to satisfy, or nearly satisfy, the following equation:

$$\sqrt{t \sin(\theta)} = E/2$$

The above relationship is appropriate for dot sighting devices of the present invention. Only the magnitude of the thickness t is used in calculating for the eccentricity E in the above equation. The unit of the parameter t must be the same as the eccentricity E, but is disregarded for the purpose of the above equation.

Figure 7:
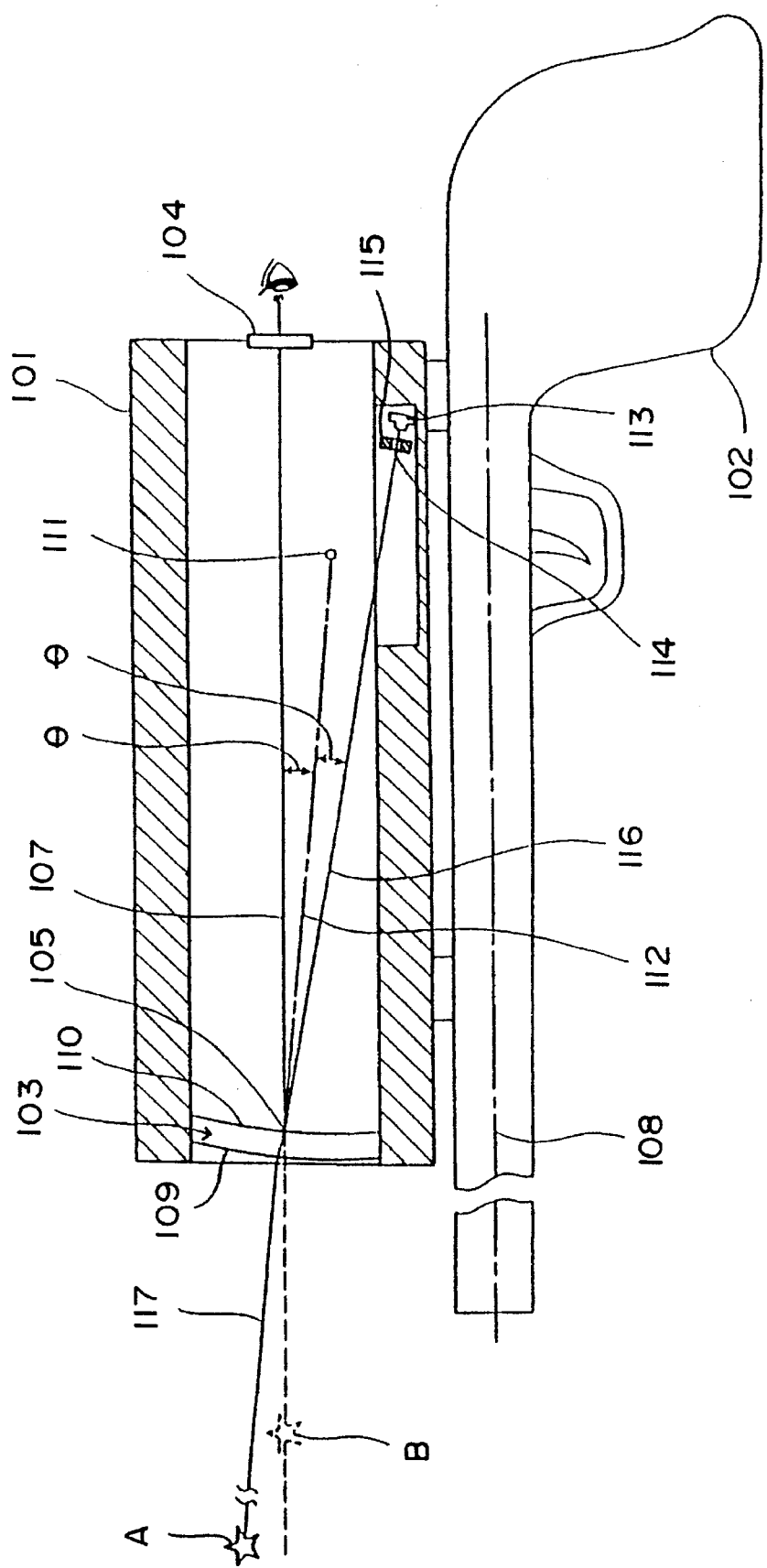
FIG. 7 is a side sectional view of a dot sighting device of the prior art.
Figure 8:
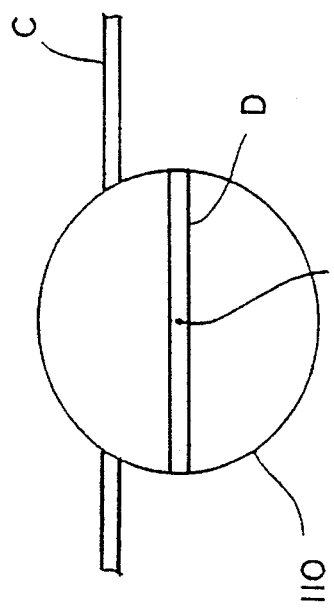
FIG. 8 is a diagram showing the alignment of the false image in the field of view in the dot sighting device of the prior art shown in FIG. 7.
Figure 9:
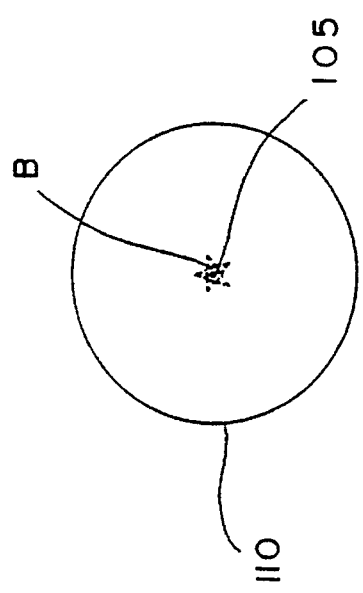
FIG. 9 is a a diagram showing the discrepancy between the false image in the field of view in the prior art sighting device of FIG. 7.
Figure 10:
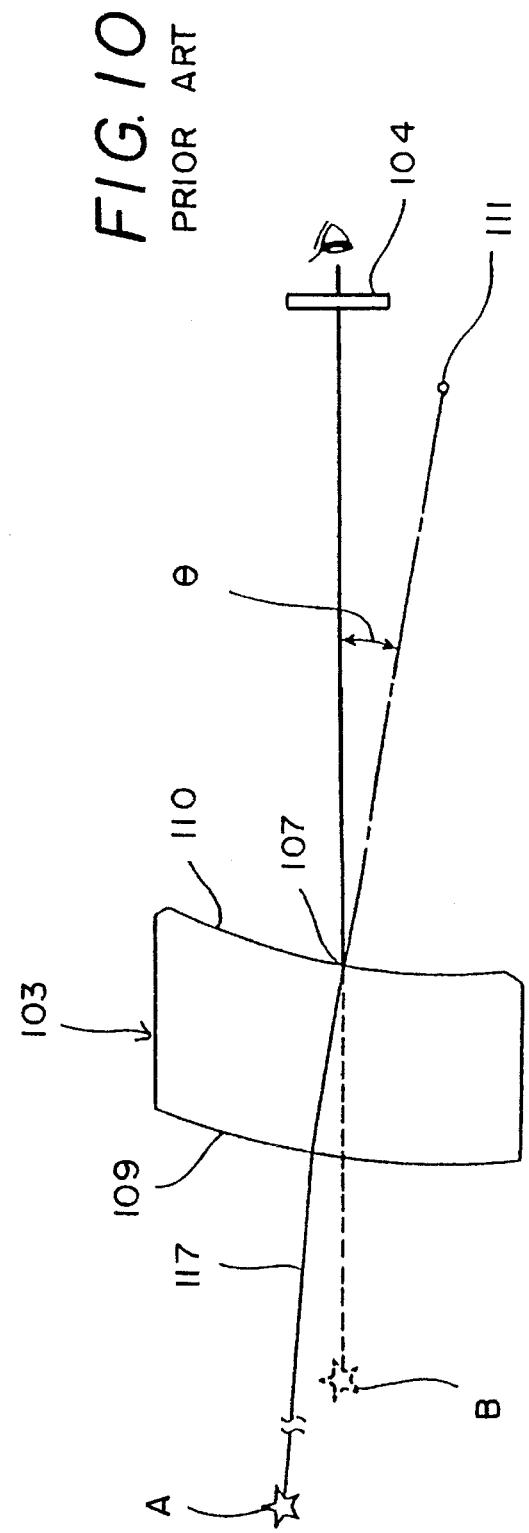
FIG. 10 is an optical diagram of the discrepancy between the real and false images of the target in the prior art sighting device of FIG. 7.

If the eccentricity of the center of curvature of the transparent concave surface does not reach E, then, as shown in FIGS. 7 and 8, the shot will be above the sight alignment point on the target. Conversely, if the amount for E is excessive, the shot will fall below the sighting point on the target.

Yet another embodiment of a dot sighting device T of the present invention will be described below with reference to the optical diagram shown in FIG. 6. In this embodiment, the transparent objective element comprises an outwardly facing spherical convex surface 57 and an inwardly facing spherical concave surface 52 and is roughly lens-like in shape. The concave surface 52 is coated with a multilayered film that reflects red light, and a transparent protective element 53 is closely attached to the concave surface 52.

The point 54 on the baseline P is the center of curvature for the concave surface 52 of the transparent objective element 50. The radius 56 from this center of curvature 54 to the center 55 of the concave surface 52 is the optic axis of concave surface 52. Relative to the baseline P, the radius 56 subtends an angle θ of 6 to 7 degrees as it extends toward the center 55 of the concave surface 52. The baseline P is parallel to the optic axis 51 of the dot sighting device T.

The center of curvature 59 of the convex surface 57 is in an eccentric position on the other side of the radius 56 with the baseline P as the boundary, and the eccentricity from the baseline P is shown by the arrow-ended line E. This center of curvature 59 has also been shifted slightly farther away from the transparent objective element 50 than the center of curvature 54 for the concave surface 52. The radius N from the center of curvature 59 through the center 58 of the convex surface 57 lies in the plane containing the baseline P and the radius 56. Point 60 on the baseline P is the center of curvature for the concave surface of the transparent protective element 53. Also, the transparent objective element 50 and transparent protective element 53 are made of glass having the same refractive index.

The combined thickness t of the transparent objective element 50 and the transparent protective element 53 along the baseline P, the foregoing angle θ, and the eccentricity E satisfy the above specified equation.

Figure 6:
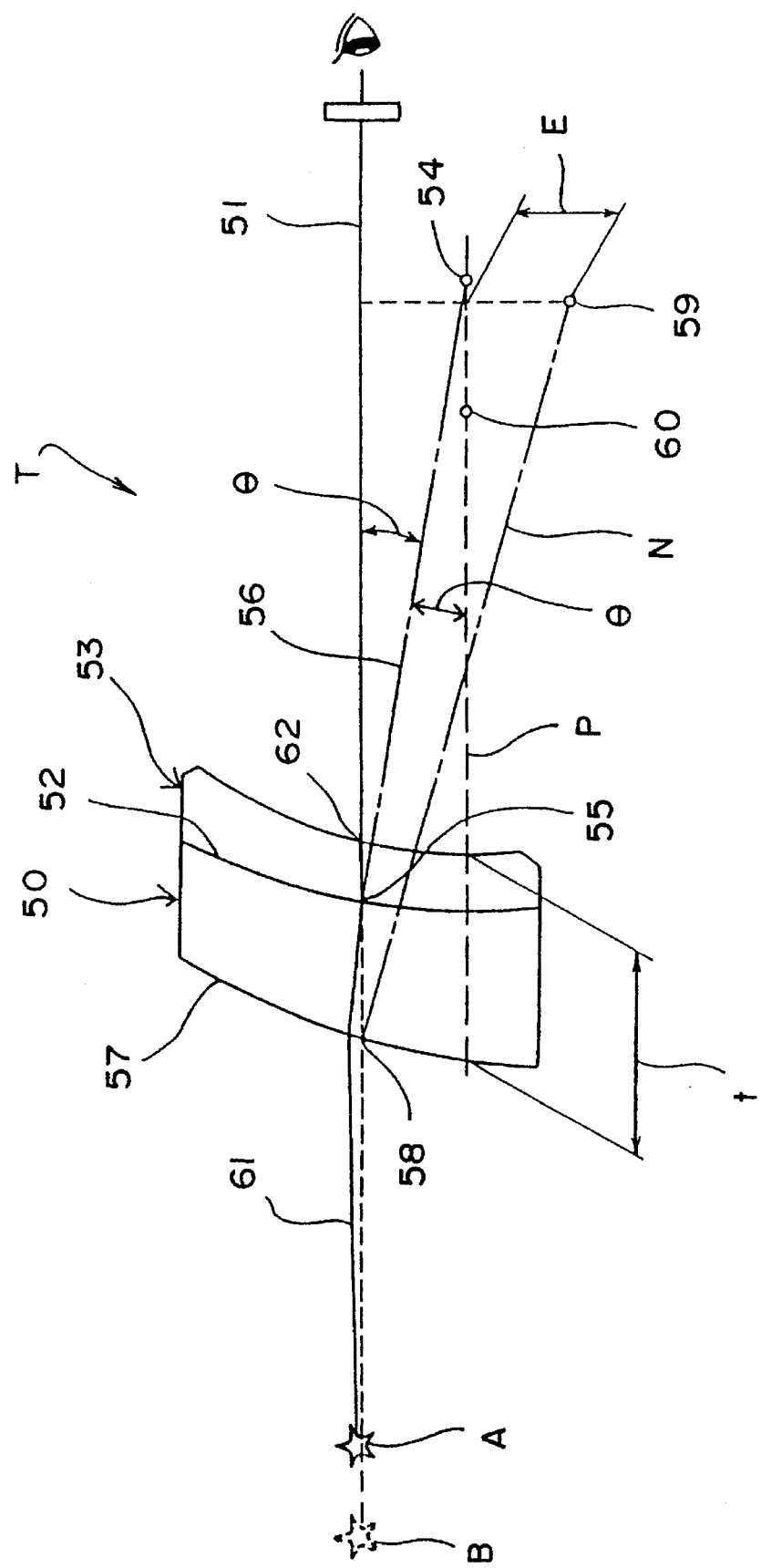
FIG. 6 is a side view showing the optical configuration for yet another embodiment of the dot sighting device of the present invention.

In FIG. 6, target A lies in the extension of the optic axis 51. Incoming light ray 61, which is slightly off center of target A, is refracted at convex surface 57, passes straight through the transparent objective element 50 and the transparent protective element 53, and is again refracted at the center 62 of the concave surface of the transparent protective element 53, and then proceeds straight along the optic axis 51. As a result, the field of view of the dot sight is as shown in FIG. 3. The actual image of target A is behind the center 55 of the concave surface 52.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A dot sighting device, comprising:
   a) a lens-shaped transparent objective element with convex and concave surfaces, said convex surface extending outwardly toward a target and said concave surface extending toward a user's eye;
   b) said concave surface having a first center of curvature lying on a baseline parallel to an optical axis of said element extending from a center of said element to the user's eye;
   c) said concave surface having a first radius from said first center of curvature of said concave surface to a center of said concave surface;
   d) said baseline and said first radius subtending an angle $\theta$ with each other;
   e) said convex surface having a second center of curvature positioned eccentrically from said first center of curvature located in a plane containing said baseline and said first radius;
   f) said convex surface having a second radius extending from said second center of curvature to a center of said convex surface;
   g) a light source disposed behind said element and directed toward said center of concave surface such that a light flux makes an angle $\theta$ with said first radius, said light source being adapted to project a light dot on said concave surface to be reflected to the user's eye;
   h) said baseline extends through said element at thickness t;
   i) said first and second centers of curvatures are eccentric from each other at a distance E; and
   j) said thickness t, said distance E and said angle $\theta$ satify substantially the equation, $$\sqrt{t \sin(\theta)} = E/2,$$

where t and E have the same units and only the magnitudes of t and E are used and $\theta$ is in the range of 6°–7°.

2. A dot sighting device as in claim 1, wherein:
   a) said convex surface is a spherical surface centered on said second center of curvature.

3. A dot sighting device as in claim 1, wherein:
   a) said concave surface includes a reflective film.

4. A dot sighting device as in claim 3, wherein:
   a) said film reflects red light.

5. A dot sighting device as in claim 1, wherein:
   a) a transparent protective element is attached to said concave surface.

* * * * *